United States Patent [19]

Hamada et al.

[11] Patent Number: 4,814,793
[45] Date of Patent: Mar. 21, 1989

[54] FILM HANDLING MEANS FOR A LASER RECORDER

[75] Inventors: Akiyoshi Hamada; Mitsutoshi Yagoto, both of Toyokawa; Yutaka Watanabe, Tokyo; Shuji Mochizuki, Yamanashi; Masayuki Mino, Toyokawa; Yutaka Tanaka, Kawasaki; Kyoji Tachikawa, Yamanashi, all of Japan

[73] Assignees: Minolta Camera Kabushiki Kaisha, Osaka; Nippon Seimitsu Kogyo Kabushiki Kaisha, Yamanashi, both of Japan

[21] Appl. No.: 41,079

[22] Filed: Apr. 21, 1987

[30] Foreign Application Priority Data

| Apr. 22, 1986 | [JP] | Japan | 61-92865 |
| Apr. 22, 1986 | [JP] | Japan | 61-92866 |
| Apr. 26, 1986 | [JP] | Japan | 61-97415 |
| Apr. 26, 1986 | [JP] | Japan | 61-97416 |
| Apr. 26, 1986 | [JP] | Japan | 61-97417 |
| Apr. 26, 1986 | [JP] | Japan | 61-97418 |
| Apr. 26, 1986 | [JP] | Japan | 61-97419 |
| Apr. 26, 1986 | [JP] | Japan | 61-63463[U] |

[51] Int. Cl.$^4$ .................. G01D 9/42; G01D 15/24
[52] U.S. Cl. .................. 346/108; 346/136; 355/16
[58] Field of Search ........... 346/108, 107 R, 76 L, 346/76 PH, 160, 136; 355/16

[56] References Cited

U.S. PATENT DOCUMENTS

| 4,257,053 | 3/1981 | Gilbreath |  |
| 4,302,408 | 12/1981 | Kiyohara | 346/76 L |
| 4,573,059 | 2/1986 | Shinma | 346/76 PH |
| 4,598,300 | 7/1986 | Ono | 346/136 |

FOREIGN PATENT DOCUMENTS 57-193170 11/1982 Japan.
59-116748 7/1984 Japan.

Primary Examiner—E. A. Goldberg
Assistant Examiner—Mark Reinhart
Attorney, Agent, or Firm—Burns, Doane, Swecker & Mathis

[57] ABSTRACT

A laser recorder applicable to computer output microfilm recording apparatus comprises: a housing, a film feed unit having a film cassette loaded with a rolled heat development film; a film take-up unit for taking up the heat development film on a reel or on a tray, including a film storing mechanism for storing cut films sequentially; a main driving unit for driving the heat development film for advancing at a fixed speed for auxiliary scanning for recording image information on the heat development film, including a slackened film relief mechanism for eliminating slackened film around the main driving unit and a stepping motor driving current control circuit for driving the main driving unit at a low and fixed speed; loop detectors for preventing film feed force and film delivery force from working on the main driving unit, an image information recording unit for main scanning, having a laser optical system for scanning the heat development film across the width thereof to record image information recorded on the heat development film thereon; and a heat-development unit for heat-developing the image information recorded on the heat development film, including a delivery driving roller unit and a guide roller unit driven at different speeds respectively for eliminating slackened film around the heat-development unit as well as controlling the heat-development time, a temperature controller for controlling heat-development unit temperature, and a swing roller for separating the film from the heat-development unit when heat-development is not required.

11 Claims, 12 Drawing Sheets

FILM HANDLING MEANS FOR A LASER RECORDER

BACKGROUND OF THE INVENTION

1. Field of the Invention

The present invention relates to a laser recorder suitable for use, for example, as a computer output microfilm producing apparatus (hereinafter abbreviated to "COM apparatus") which records image information on a dry silver halide photographic film by using a laser beam emitted from a laser, and then develops the image information by a heat development process.

2. Discussion of the Prior Art

Improvement of the performance and enhancement of the functions of reproducing apparatus for reproducing the output of information processing equipment including computers have become a significant subject of research and development with the progressive development of high-performance information processing equipment. Among those reproducing apparatus, reproducing apparatus employing a laser light source, such as laser printers and the like, are the most prospective reproducing apparatus. For example, U.S. Pat. No. 4,257,053 discloses a basic method and construction of a plotter using a laser as a light source. Japanese Patent Application Laid-Open NO. SHO 59-116748 discloses a heat-developing device wherein a laser beam is radiated to a heat development film. Japanese Patent Application Laid-Open No. SHO 57-193170 discloses a laser recorder where the auxiliary scanning is operated by a stepping motor. However, the conventional reproducing apparatus have not been satisfactory in size and performance. With COM apparatus also, the furtherance of reduction in size, particularly in thickness, simplification of operation and improvement of the performance have become necessary with the development of high performance information processing equipment.

SUMMARY OF THE INVENTION

Therefore, it is an object of the present invention to provide a laser recorder capable of forming a more accurate image on a film by radiating a laser beam on the film, by driving the heat development film in the direction of auxiliary scanning at a low speed and improving the accuracy in driving the film.

It is a further object of the present invention to provide a control mechanism for maintaining fixed ranges of the size of loops before and after the main driving roller, which drives the film for running at a fixed speed, with respect to the direction of running of the film, and more particularly, to stabilize the speed of the film driving on the main driving roller by maintaining the above mentioned loop by changing the film driving speed in a range that does not affect the quality of images.

It is a further object of the present invention to bring the film into close contact with a driving roller, by absorbing slack of the film which occurs upon the initial setting of the film on the driving roller, on the main driving roller portion having a plurality of pressure rollers in the film conveying unit.

It is an object of the present invention to provide a laser recorder in which the film, being constantly brought into contact with the heat development unit, is separated from the heat development unit while it is unnecessary to be heat-developed.

It is a further object of the present invention to obtain the right order of pieces of film which are cut into predetermined lengths and discharged to be collected, by making a layer between the edge portion of a piece of film and the edge portion of the next piece of film, enabling the pieces of film to be in right order in a following conveying process also, in the conveying unit.

It is a further object of the present invention to prevent unevenness of image density on the film by giving a predetermined degree of tension to the film to bring the film into close contact with the heat development unit when developing the film at the heat development unit.

It is a further object of the present invention to keep the heat roller at a fixed temperature by detecting the surface temperature of the heat roller storing the obtained data, and controlling the control current of the heater in the heat development unit on the basis of the stored temperature data and the present temperature data.

It is a further object of the present invention to give a main driving roller a smooth rotation by employing a stepping motor as a driving means of the main driving roller, and finely changing the current by further dividing each step angle of each step pulse instead of an electric pulse as a driving signal.

BRIEF DESCRIPTION OF THE DRAWINGS

Other objects and features of the invention will become apparent to those skilled in the art as the disclosure is made in the following description of preferred embodiments of the invention, as illustrated in the accompanying sheet of drawings, in which.

DETAILED DESCRIPTION OF THE PREFERRED EMBODIMENTS

Figure 1:
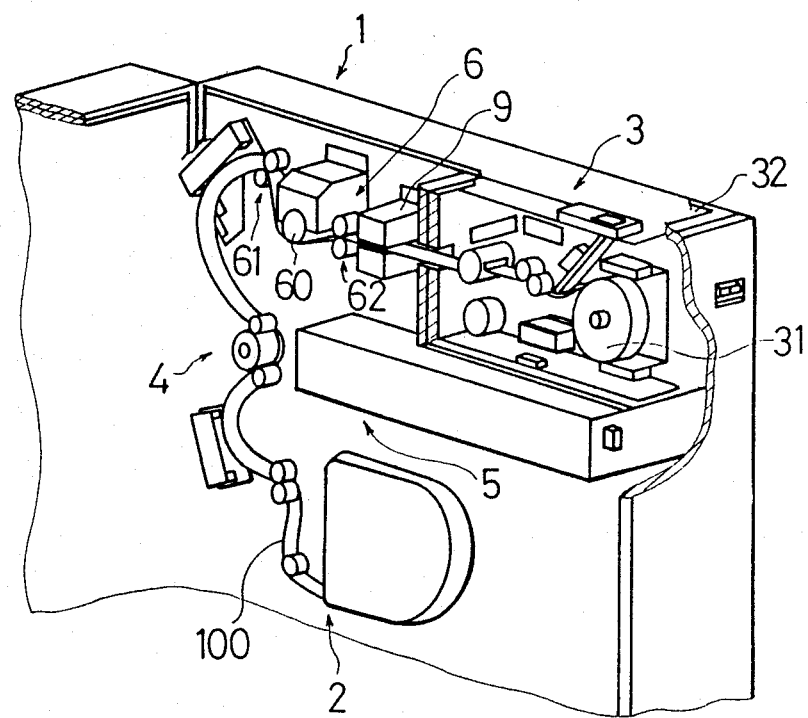
FIG. 1 is a perspective schematic illustration showing the configuration of a laser recorder, in a preferred embodiment, according to the present invention.
Figure 2:
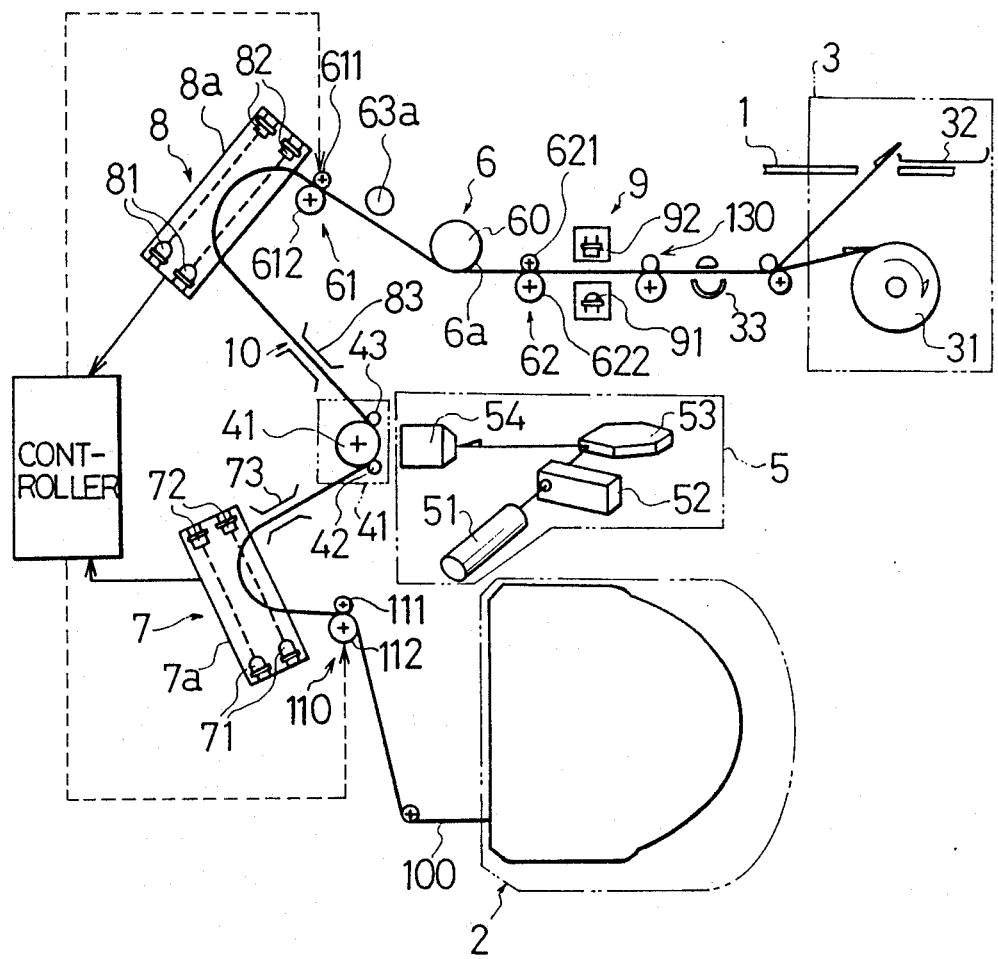
FIG. 2 is a schematic front view showing the configuration of a laser recorder, in a preferred embodiment, according to the present invention.

Referring to FIGS. 1 and 2, a laser recorder in a preferred embodiment, according to the present invention, is explained in general.

The laser recorder in the preferred embodiment comprises a housing 1, a film feed unit 2, a heat-developed film take-up unit 3, a main driving unit 4, an image information recording unit 5, a heat-development unit 6, and a controller. The film feed unit 2, the heat-developed film take-up unit 3, the main driving unit 4, the image information recording unit 5, the heat-development unit 6, and the controller are disposed in the housing 1 shut and enclosed from the environment so as to form a dark room.

The film feed unit 2 comprises a cassette for a rolled heat-development film 100 which is disposed in the lower section of the housing 1. For the rolled heat-development film (hereinafter referred to as film), a 16 mm dry silver halide film, such as a DAKOMATIC film registered trademark; produced by Eastman Kodak Co.) may be used.

The heat-developed film take-up unit 3 is disposed in the upper section of the housing 1 so that a vertically long film path is formed between the film feed unit 2 and the heat-development film take-up unit 3. The heat-development film take-up unit 3 comprises a film take-up reel 31, disposed in the upper section of the housing 1, and a tray 32 for storing cut films, disposed at the outside of the housing 1. Film advancement direction can be switched either to the film take-up reel 31 or to the tray 32 by a switching device, not shown, as desired. Therefore, depending on film applications, the heat-developed film is taken up by the film take-up reel 31 when a roll of film is required, or is stored in the tray 32 after being cut by a cutter 33 when cut films are required.

The main driving unit 4 is for driving the film 100 at a fixed speed, and is disposed between the film feed unit 2 and the heat-developed film take-up unit 3 on the film path 10 in the middle section of the housing 1.

The controller is for controlling the film feed unit 2, the heat-developed film take-up unit 3, the main driving unit 4, the image information recording unit 5, and the heat-development unit 6.

Forming Loops before and after the Main Driving Roller and Loop Detectors

Referring to FIGS. 1 and 2, a laser recorder, comprising loop detectors, according to the present invention, is explained.

The main driving unit 4 comprises a main driving roller 41, which is driven by a stepping motor (not shown) at a low speed, and whose outer circumference is brought into contact with the film 100, and at least two pressure rollers 42 and 43, which press the film 100 against the outer circumference of the main driving roller 41, a feed driving roller unit 110, which feeds the film 100 to the main driving unit 4 while maintaining looped state of the film 100, and a delivery driving roller unit 61, which delivers the film 100 to the later-described heat-development film unit 6 while maintaining looped state of the film 100. Thus, this construction does not allow the film 100 feed and deliverly force to work on the main driving roller 41.

A first film loop detector 7 and a second loop detector 8 are disposed between the main driving roller 41 and the feed driving roller unit 110, and between the main driving unit 41 and the delivery driving roller unit 61, respectively. Film guides 73 and 83 are provided between the first loop detector 7 and the main driving roller 41 and between the main driving roller 41 and the second loop detector 8, respectively. The feed driving roller unit 110 and the delivery driving roller unit 61 are controlled according to signals generated by the first and the second film loop detectors 7 and 8, respectively.

The feed driving roller unit 110 comprises a smaller diameter driving roller 111, interlocking with a motor which starts and stops the roller 111 according to ON and OFF signals generated by the first loop detector 7. The feed driving roller unit 110 also includes a larger diameter driven roller 112, which is brought into contact with the driving roller 111 through the film 100 and is driven by the driving roller 111. The delivery driving roller unit 61 comprises a smaller diameter driving roller 611, interlocking with a motor which starts and stops the roller 611 according to ON and OFF signals generated by the second loop detector 8. The delivery during roller unit 61 also includes; a larger diameter driven roller 612, which is brought into contact with the driving roller 611 through the film 100 and is driven by the driving roller 611. The first loop detector 7, disposed between the main driving unit 4 and the feed driving roller unit 110, comprises two pairs of an infrared ray emitting diode 71 and a photodiode 72 which are installed on a board 7a. The second loop detector 8, disposed between the main driving unit 4 and the delivery driving roller unit 61, comprises two pairs of an infrared ray emitting diode 81 and a photodiode 82 which are installed on a board 8a. Thus, loop amounts of the film 100 between the infrared ray emitting diode 71 and the photodiode 72, and between the infrared ray emitting diode 81 and the photodiode 82, are detected by the first and the second loop detectors 7 and 8. The detectors 7 and 8 transmit the ON or OFF signal to the feed driving roller unit 110 and the delivery driving roller unit 61 depending on loop amounts of the film 100. Thus, the feed driving roller unit 110 and the delivery driving roller unit 61 can be activated or deactivated.

In the laser recorder as constructed above, the rolled heat-development film 100, loaded in the film feed unit 2, is drawn out of the film feed unit 2 and set along the film path 10 in advance in the housing 1 shut and enclosed from the environment so as to form a dark room.

When the laser recorder is actuated, the film feed unit 2, the feed driving roller unit 110, the main driving unit 4, the delivery driving roller unit 61, and advancement driving rollers 130 start working. Then, the film 100 is delivered to the main driving unit 4 by the feed driving roller unit 110 while maintaining the looped state. The film 100 is advanced by the main driving roller 41 driven by a stepping motor (not shown) while being pressed against the outer circumference of the main driving roller 41 by two pressure rollers 42 and 43. When the film 100 advances on the main driving roller 41, the laser beam generated by the image information recording unit 5 is radiated onto the surface of the film 100 opposite to the surface contacting with the main driving roller 41. The film 100, on which image information is recorded by the image information recording unit 5, is delivered to the heat-development unit 6 while maintaining the looped state between the main driving roller 41 and the delivery driving roller unit 61. And then, the film 100 surface opposite to the surface onto which the image information recording unit 5 radiates the laser beam, is brought into contact with the heat-developed film unit 6 where the film 100 is heat-developed. After heat-development, the film 100 is advanced via the image density detector 9 to the film take-up unit 3 by the advancement driving rollers 130, and the film 100 is stored in the heat-developed film take-up unit 3.

In this laser recorder operation, the film 100, drawn out of the film feed unit 2, advances while maintaining its looped states between the main driving roller 41, with which the film 100 is brought into contact and which revolves at a low speed, and the feed driving roller unit 110 at the feed side, from which the film 100 approaches the main driving roller 41, and between the main driving roller 41 and the delivery driving roller unit 61 at the discharge side, for which the film 100 leaves the main driving roller 41. Thus, no force for feeding and delivering the film 100 works on the main driving roller 41 and on the film 100 which is at a position contacting with the main driving roller 41.

Therefore, the revolving speed of main driving roller 41 is substantially stabilized. And not only the advancement speed of the film surface, onto which the laser beam is radiated, is stabilized but also a lowspeed and highly accurate film delivery condition is achieved, because the film 100 advances under the condition that the film surface opposite to the laser beam radiated surface is pressed against and is brought into contact with the outer circumference of the main driving roller 41 by the pressure rollers 42 and 43.

Accordingly, the laser beam radiation on the heat-development film in the auxiliary scanning direction is performed highly accurately, and image information is recorded favorably.

Further to the above described advantages, no force for feeding and delivering the film 100 works on the main driving roller 41, and the state can be always maintained, because the above described film 100 loop amounts are detected by the first and the second loop detectors 7 and 8, and the feed driving roller unit 110 and the delivery roller unit 61 are controlled according to signals generated by the first and the second detectors 7 and 8.

For an alternative to the above second loop detector, the second loop detector may be constructed so as to work as follows:

When the upper limit sensors of the second loop detector 8 detect the film 100, the film advancement speed of delivery driving roller unit 61 is increased by an amount, which does not adversely affect image quality, namely by approximately ±2% of the base speed of the motor for driving the main driving roller 41. And when the lower limit sensors of the second loop detector 8 do not detect the film 100, the film advancement speed of delivery driving roller unit 61 is decreased by an amount, which does not adversely affect image quality, namely by approximately ±2% of the base speed of the motor to restore the film 100 loop amount falling between the upper and lower limits.

Similarly, the first loop detector 7 works to stop and start the feed driving unit 110 as described above.

The alternative embodiment also provides the same advantages which have been described above i.e., a highly accurate laser scanning in the auxiliary direction as well as the mechanism which prevents film feeding and delivering forces from working on the main driving roller 41.

Although the film loop detectors have been described as applied to the laser recorder, the film loop detectors according to the present invention are not limited thereto in its application. The film loop detector is effectively applicable to an advancement means for a continuous recording medium, etc. requiring an accurate film feed speed on the main driving roller.

Slackened Film Relief Mechanism

Figure 6:
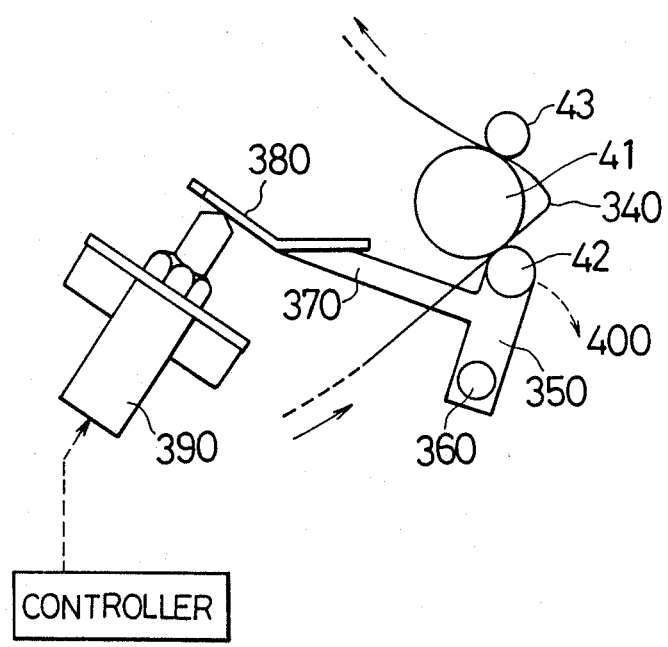
FIG. 6 is a schematic enlarged illustration of the major sections of the slackened film release mechanism for keeping film in close contact with the main driving roller in the preferred embodiment according to the present invention.

Referring to FIG. 6, the laser recorder comprising a slackened film relief mechanism for keeping the film 100 in close contact with the main driving roller 41, according to the present invention, is explained.

The main driving roller 41 is driven by a motor (not shown), such as a stepping motor. Pressure rollers 42 and 43 are pressed, respectively, against the main driving roller 41 at the opposite circumferential ends of a section in the circumference of the main driving roller 41 in which the film 100 is exposed to the laser beam to write image information on the film 100. The main driving roller 41 is driven for rotation by the stepping motor so that the film 100 is advanced at a fixed speed.

In order to eliminate slack 340 of film 100 on the circumference of the main driving roller 41, the laser recorder is provided with a slackened film relief mechanism for pressing the first pressure roller 42 against the main driving roller 41 and separating the first pressure roller 42 from the main driving roller 41. The slackened film relief mechanism comprises a swing arm 350 rotatably supporting the pressure roller 42 at one end thereof and having a finger 370 perpendicularly extending from the body thereof, a shaft 360 pivotally supporting the swing arm 350 at the other end of the same, a bracket 380 attached to the free end of the finger 370, and a solenoid 390 contacting the bracket 380.

In operation, upon the start of the motor to rotate the main driving roller 41, the solenoid 390 is energized to push the bracket 380, and thereby the swing arm 350 is swung around the shaft 360 in a direction indicated by an arrow 400 in FIG. 6 to separate the first pressure roller 42 from the main driving roller 41 before starting laser recording operation. The solenoid 390 is kept energized for a predetermiend period of time, approximately one second, and then the solenoid 390 is de-energized to allow the first pressure roller 42 to contact the main driving roller 41. While the first pressure roller 42 is separated from the main driving roller 41, any slack 340 of the film 100, which has occurred during the film 100 manual setting, is eliminated by the rotation of the main driving roller 41 and the second pressure roller 43. The first pressure roller 42 is then brought into contact with the main driving roller 41 again for the normal laser recording operation after the slack 340 has been eliminated.

Although the slackened film relief mechanism has been described as applied to the laser recorder, the slackened film relief mechanism is not limited thereto in its application. The slackened film relief mechanism effectively elminates the slack of continuously delivered according medium, which has occurred in the recording medium setting to various recording medium advancement systems before starting the various advancement systems.

Film Pressing and Separating Mechanism to and from the Heat Roller

Referring to FIGS. 1, 2, 7 and 8, a laser recorder, including a machanism for pressing and separating the film to and from the heat roller, according to the present invention, is explained.

The heat-development unit 6 comprises a heat roller 60, a delivery driving roller unit 61, a guide roller unit 62 and a swing roller 63a. The heat roller 60 has an outer circumference 6a onto which the film 100 is brought into contact and by which the film 100 is heated. The delivery driving roller unit 61 and the guide roller unit 62 are disposed on opposite sides of the heat roller 60 to guide the film 100. The swing roller 63a is disposed between the delivery driving roller unit 61 and the guide roller unit 62 and functions to contact and release the film 100 from the heat roller 60 by applying force to one of the film surfaces.

The delivery driving roller unit 61 comprises a smaller diameter driving roller 611, which interlocks with a DC motor, and a large diameter driven roller 612, which presses the film 100 against the driving roller 611 and is driven by the driving roller 611 through the film 100.

The guide roller unit 62 comprises a smaller diameter driving roller 621, which interlocks with a DC motor, and a larger diameter driven roller 622, which presses the film 100 against the driving roller 621 and is driven by the driving roller 621 through the film 100.

The swing roller 63a is disposed at the same side of the film 100 as the heat roller 60. The swing roller 63a swings and urges the film 100 to release it from the heat roller 60.

A solenoid (not shown) may be used as an actuator for swinging the swing roller 63a. When the solenoid is energized, the solenoid magnetically attracts and keeps the swing roller 63a at a position away from the backside of the film 100. When the solenoid is de-energized, the solenoid is swung to contact the film 100 and urge the film away from the heat roller 60 with pressure.

The film 100 is set in advance so that its backside contacts the heat roller 60 during heat-development while the film 100 is stretched by tensile force between the delivery driving roller unit 61 and the guide roller unit 62.

During heat-development, the swing roller 63a, disposed at the same side of the film 100 as the heat roller 60, is placed at a position away from the film 100 so that it does not apply a force to the backside of the film 100. Thus, the film 100 maintains the stretched state by the tensile force effected between the delivery driving roller unit 61 and the guide roller unit 62, which are disposed at both sides of the heat roller 60.

During the contact with the heat roller 60 between the delivery driving roller unit 61 and the guide roller unit 62, a certain amount of heat, which is necessary for heat-development, is given to the film 100 by the heat roller 60. Thus, image information, recorded on the film 100 by the image recording unit 5, can be heat-developed.

An image density detector of the heat-developed image information on the film 100 is diposed between the heat-development unit 6 and the heat-developed film take-up unit 3 on the film path 10. The image density detector comprises a light emitting diode 91 and a photodiode 92 which are disposed facing the front and backside of the film 100, respectively.

In the laser recorder comprising the film pressing and separating mechanism to and from the heat roller as constructed above, the film 100 is driven and advanced at a fixed speed by the main driving unit 4, and the emulsion-coating front surface of the film 100 is exposed to the laser beam radiation from the image information recording unit 5 while its backside surface is brought into contact with the outer circumference of the main driving roller 41. After the laser beam radiation, the film 100 is advanced while being guided by the delivery driving roller unit 61 and the guide roller unit 62, and the backside of the film 100 is brought into contact with the heat roller 60 between the delivery driving roller unit 61 and the guide roller unit 62 to heat-develop the emulsion-coated front surface of the film 100. Then, the film 100 passes through the image density detector 9 and is taken up by the film take-up reel 31.

Figure 7:
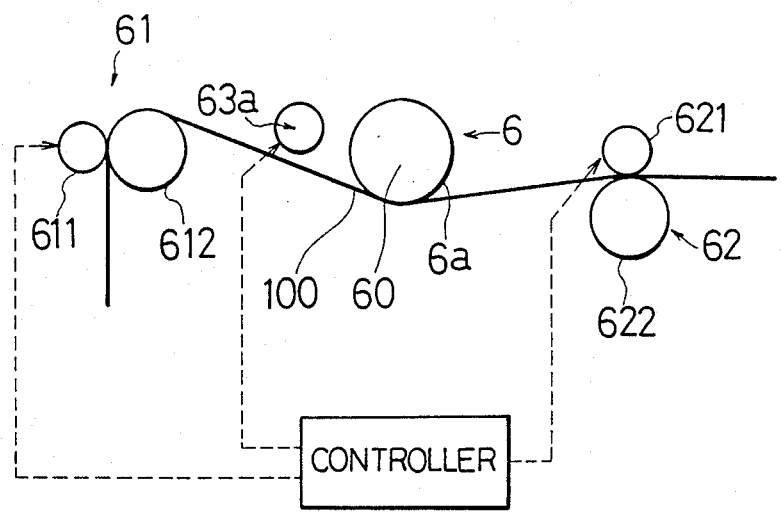
FIGS. 7 and 8 are schematic front views showing the major sections of the mechanism for pressing and separating the film to and from the heat roller according to the present invention.
Figure 8:
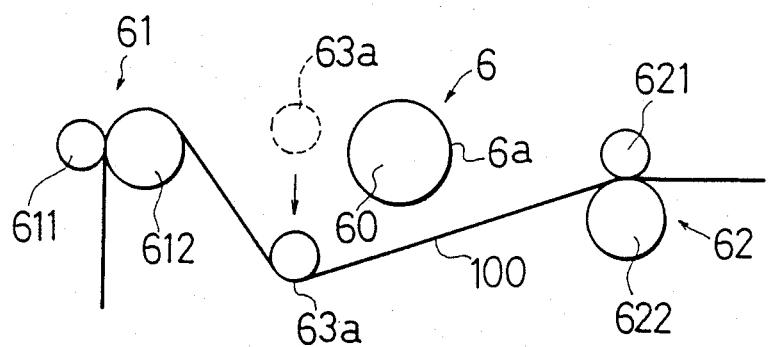

When the film advancement or the heat-development is stopped, the swing roller 63a swings from a position specified by the continuous line in FIG. 7, or from a position specified by the broken line in FIG. 8, to a position specified by the continuous line in FIG. 8, and urges the film 100 to release it from the heat roller 60. Thus, a high-temperature heat from the heat roller 60 is not transmitted to the film 100 because the film 100 does not contact the heat roller 60 when the film 100 advancement is stopped. Accordingly, the film 100 is free from adverse effects of the high-temperature heat because the film 100 does not receive the high-temperature heat at one portion thereof for long time when the film advancement is stopped. The film 100 can be heat-developed again as described above when the swing roller 63a is brought back to the position specified by the broken line from the position specified by the continuous line in FIG. 8 and the film 100 is advanced while contacting the heat roller 60.

Figure 9:
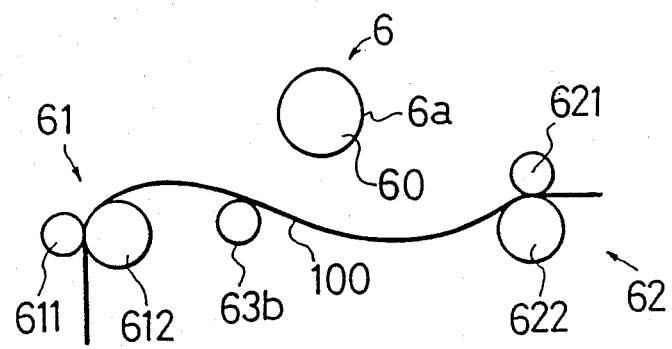
FIGS. 9 and 10 are schematic front views showing the major sections of the first alternative for the mechanism for pressing and separating the film to and from the heat roller according to the present invention.
Figure 10:
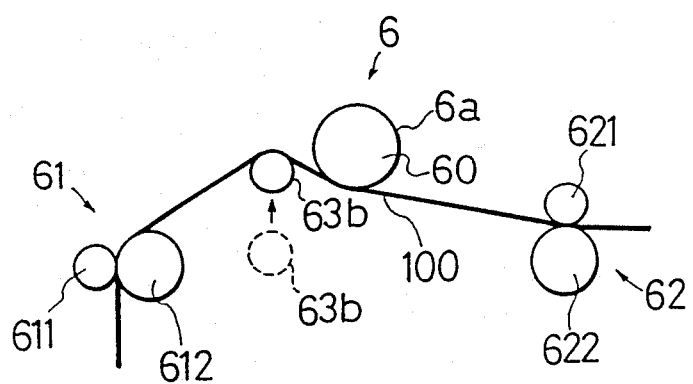

Referring now to FIGS. 9 and 10, a laser recorder, comprising a first alternative embodiment for the film pressing and separating mechanism from the heat roller, according to the present invention, is explained. The same configurations and operations as the first preferred embodiment are not explained.

In the case of this first alternative mechanism, the swing roller 63b is disposed at the side of the film 100 opposite to the heat roller 60. The swing roller 63b swings to urge the film 100 into contact with the heat roller 60. The film 100 is so set in advance that the backside of the film 100 does not contact the heat roller 60 by hanging the film slackened between the delivery driving roller unit 61 and the guide roller unit 62 when the heat-development is not required.

When image information, recorded on the film 100 by the image information recording unit 5, is required to be heat-developed, the swing roller 63b swings to a position specified by the continuous line in FIG. 10. The film 100 is advanced while contacting the heat roller 60. A high-temperature heat of the heat roller 60 is transmitted to the backside of the film 100, and the image information, recorded on the emulsion-coated surface of the film 100 by the image information recording unit 5, can be heat-developed.

When the advancement of the film 100 and the operation of the heat roller 60 should be deactivated to stop heat-development, the swing roller 63b swings back to a position specified by the broken line in FIG. 10, or to a position specified by the continuous line in FIG. 9, from the position specified by the continuous line in FIG. 10, and stops urging the film 100 toward the heat roller 60. Thereby, the film 100 is released from the heat roller 60, and is moved to such a position that the film 100 does not receive adverse effects of heat from the heat roller 60. Therefore, the film 100 is not adversely affected by a high-temperature heat.

Figure 11:
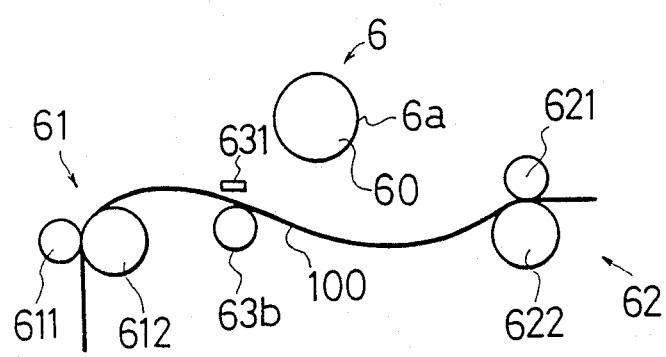
FIGS. 11 and 12 are schematic front views showing the major sections of the second alternative for the mechanism for pressing and separating the film to and from the heat roller according to the present invention.
Figure 12:
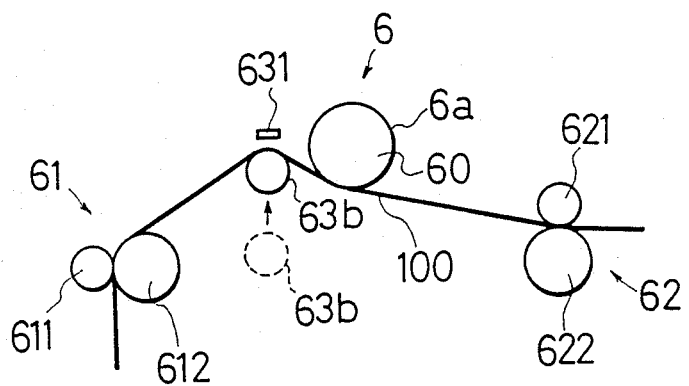

In reference to FIGS. 11 and 12, a second alternative embodiment for the film pressing and separating mechanism to and from the heat roller is explained.

This second alternative mechanism uses one set of the swing roller 63b, disposed at the side of the film 100 opposite to the heat roller 60, and a guide 631, disposed at the side of the film 100 opposite the swing roller 63b. The swing roller 63b and the guide 631 swing in the same direction. Space is provided between the swing roller 63b and the guide 631 so that the film movement cannot be disturbed in the film advancement direction. Thus, the swing roller 63b and the guide 631 securely guide the film 100 either in the direction to urge the film 100 to contact the heat roller 60, or in the direction to release the film 100 from the heat roller 60, when the swing roller 63b swings either in the direction to urge the film 100 toward the heat roller 60, or in the direction to release the film 100 from the heat roller 60.

Figure 13:
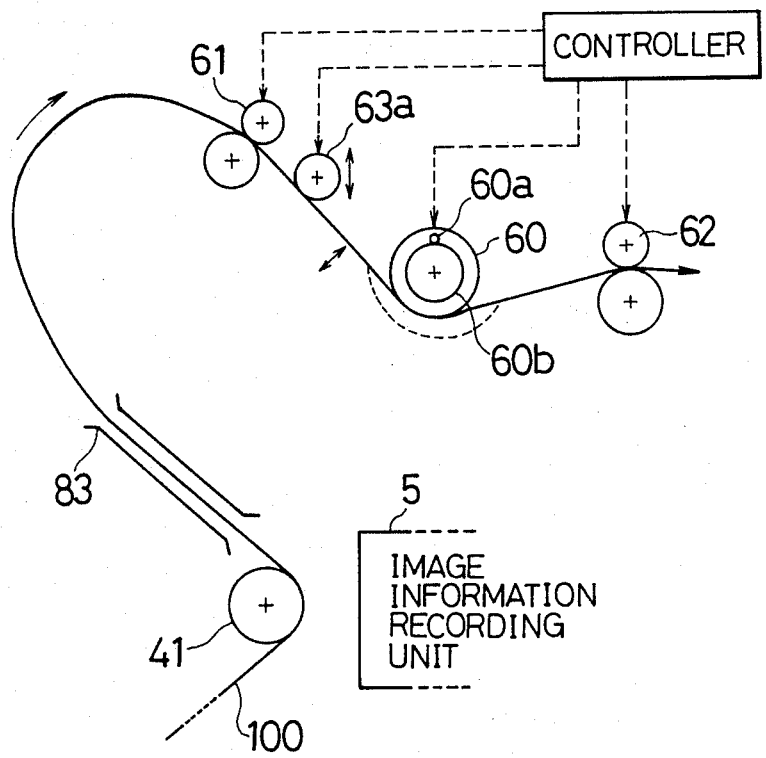
FIG. 13 is a schematic enlarged illustration showing the third alternative for the mechanism for pressing to and from the heat roller as well as the major sections of heat roller surface temperature controller according to the present invention.

The laser recorder, comprising a third alternative embodiment for the film pressing and separating mechanism to and from the heat roller, according to the present invention, is illustrated in FIG. 13.

The third alternative mechanism comprises a delivery driving roller unit 61 and a guide roller unit 62, respectively disposed before and after the heat-development unit 6, which comprises a heat roller 60 with respect to the film 100 advancement direction, and a swing roller 63a, which is disposed after the delivery driving roller unit 61 and before the heat roller 60 with respect to the film 100 advancement direction. The swing roller 63a moves the film 100 up and down perpendicularly to the film 100 advancement direction, so that an angle formed between the film 100 and the heat roller 60 becomes variable.

The third alternative mechanism thus constituted operates as follows.

The film 100 is manually set as illustrated in FIG. 13 before the operation. A slackened state of the film 100, shown by the broken line in FIG. 13, is liable to occur around the heat roller 60.

When an image information recording unit 5 is turned on, a laser beam is radiated onto the film 100 contacting a main driving roller 41, and data printing is started. At the same time, the delivery driving roller unit 61 and the guide roller unit 62 start delivering the film 100.

If the above said slackened state of film 100 has not been eliminated beforehand, it can be eliminated before the film 100, on which the first printing data is written at the main driving roller 41, reaches the heat roller 60 because the speed of the delivery driving roller unit 61 is set slower than that of the guide roller unit 62 by approximately 10%. Namely, the film 100 with the first printing data written is delivered while being pressed against the heat roller 60. After the film 100 with the first printing data is brought into contact with the heat roller 60 by this mechanism, the film 100 is slid over and delivered out of the delivery driving roller unit 61 under a constant load, because the delivery driving roller unit 61 is equipped with a friction clutch. In other words, the film 100 is not only pressed against the heat roller 60 but also delivered with a constant tension applied.

As described above, the swing roller 63a is disposed after the delivery driving roller unit 61 and before the heat roller 60 with respect to the film 100 advancement direction. An angle formed between the film 100 and the heat roller 60 can be varied by moving the film 100 up and down perpendicularly to the film 100 advancement direction with the swing roller 63a. Accordingly, even if the film 100 is delivered at a fixed speed, development time can be varied freely, because the film 100 contacting area with the heat roller 60 can be varied.

Thus, an optimum angle formed between the film 100 and the heat roller 60 can be selected while checking the developed film 100, because the film 100 contacting time with the heat roller 60 is varied by swinging the swing roller 63a.

For an altervative to this third alternative mechanism, the swing roller 63a may be disposed between the heat roller 60 and the guide roller unit 62, disposed after the heat roller 60 with respect to the film 100 advancement direction.

Heat Roller Surface Temperature Detector and Controller

Another feature of the laser recorder is that it comprises a surface temperature detector, provided to the heat-development unit having the heat roller 60, and a memory for storing temperature data from the surface temperature detector. For the above surface temperature detector, a thermoresistor (thermistor) 60a, which is in slidable contact with the heat roller 60, is employed as illustrated in FIG. 13. It is desired that the heater 60b be built-in the heat roller 60.

Figure 14:
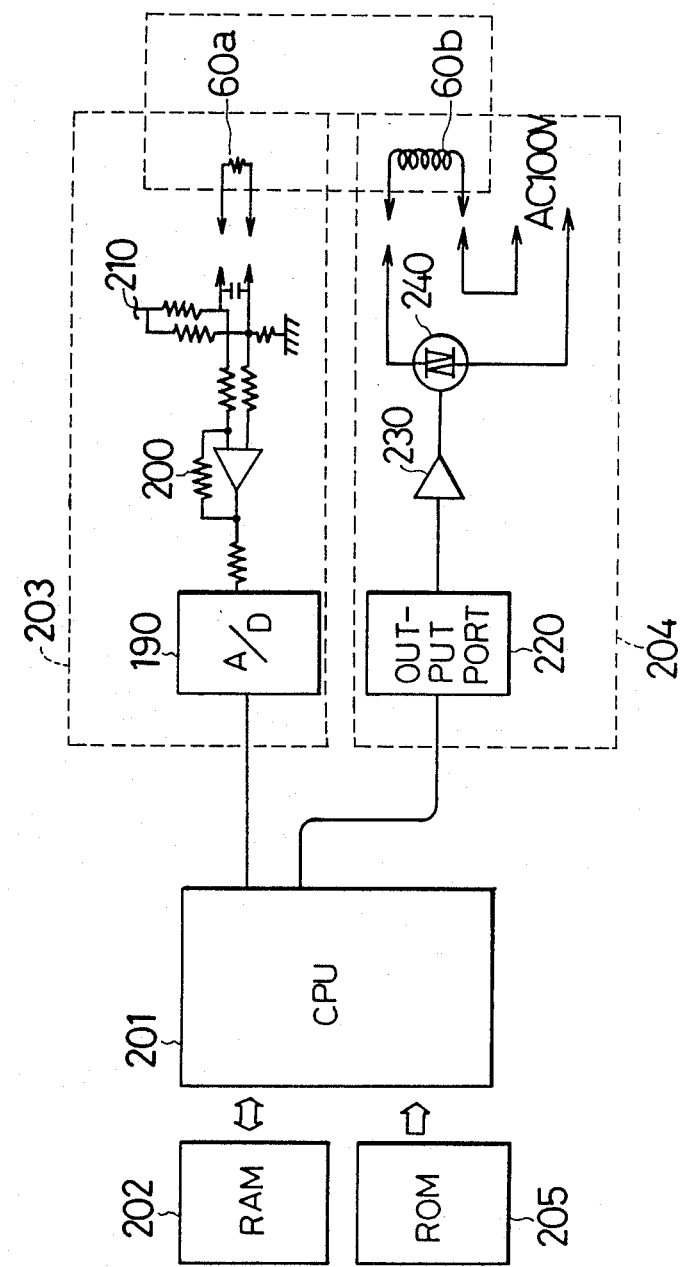
FIG. 14 is a circuit diagram showing the heat roller surface temperature controller circuit.

The heater control unit controls heater control currents in accordance with resistance value variations of the thermoresistor 60a. The heater control unit comprises a circuit as illustrated in FIG. 14. A CPU 201 is one of the main components of the above heater control unit. A heater temperature detecting circuit 203 and a heater current supply circuit are included in the heater control unit.

The heater temperature detecting circuit 203 converts thermoresistor resistance values that vary in accordance with the thermoresistor temperature variations into electric signals, and inputs the signals to the CPU 201. An amplifier 200 inputs to an A/D converter 190; analog voltage signals corresponding to the resistance values of the thermoresistor 60a, which is connected to a reference power supply 210. The A/D converter 190, in turn, converts the analog signals into digital signals, and inputs the digital signals to the CPU 201. The CPU 201 outputs a driving signal to a triac driver 230 throught an output port 220. The triac driver 230 turns on and off a triac 240 (duty control), and controls currents to be supplied to the heater 60b, which is connected to an AC 100 V power supply through the triac 240. The CPU 201 is connected to a RAM 202 (random access memory) and to a ROM 205 (read only memory) by a bus line. A CPU 201 control program, etc. are stored in the ROM 205. Data shifted from the ROM 205 and the detected temperature data are written in and read from the RAM 202 when required.

The surface temperature control operation by the CPU 201, according to the present invention, is described below with reference to FIG. 15.

The surface temperature of the heat roller 60 is sampled, for instance, every 1.28 sec., and mean temperatures for the 1.28 sec.-period are stored sequentially in the RAM 202. Here, the mean temperatures for the 1.28 sec.-period are calculated by the CPU 201 based on the heater 60b temperatures detected at certain internals. When 10 seconds have passed, a sum of estimated temperature variations for the preceeding 10 seconds is divided by the number of the sampled estimated temperature variations. Thus, a compensation data taking the heat roller 60 surface temperature variation trends is detected. Namely, the current to be supplied to the heater 60b is controlled not only by referencing to the current temperature of heater 60b but also by referencing to the surface temperature variation trends.

Thus, a length of pulse signal, namely a pulse width in a predetermined cycle, to be sent to the triac driver 230 is determined according to the obtained temperature compensation data. Before starting the next stage, the current mean temperature data is stored in the RAM 202, and the oldest mean temperature data in the RAM 202 is discarded.

The foregoing procedure is explained with reference to the following Expressions (1) and (2):

$$YoTAL_i = YoTAL + ((ACTMP - oLDTMP) \times 7 - RQTMP) tm \quad (1)$$

$$YoCNT_i = YoCNT + 1 \quad (2)$$

where;
ACTMP: current mean temperature data
oLDTMP: mean temperature data at 10 sec. before
RQTMP: required temperature data (desired temperature e.g., 115° C.)
YoTAL: sum of estimated temperature variations
YoCNT: number of YoTAL data (initial value=0)
HoSEI: compensation value (initial value=128)
oNoFD: pulse width in one cycle (initial value=30)

Figure 15:
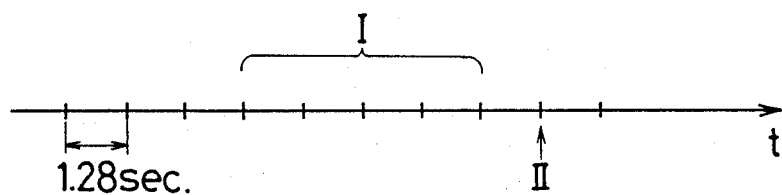
FIG. 15 is a chart for explaining the heat roller surface temperature control according to the present invention.

In Period I shown in FIG. 15, calculations using Expressions (1) and (2) are repeated. The number of calculations repeated depends on the condition of the case.

At the moment II, the mean estimate temperature variation in Period I is calculated by using the following Expression (3), where A designates a mean estimated temperature variation:

$$A = YoTAL/YoCNT \quad (3)$$

Also at the moment II, either of the following further compensations is done to a compensation value, HoSEI, determined according to the current heater 60b temperature depending on the sign of YoTAL values.

(a) YoTAL>0 (Temperature will rise beyond 115° C.):

In case, A<3.7 (°C.), the HoSEI value is further compensated by using the following Expression (4):

$$HoSEI_i = HoSEI - 1 \quad (4)$$

In case, A≧3.7 (°C.), the HoSEI value is further compensated by using the following Expression (5):

$$HoSEI_i = HoSEI - 2 \quad (5)$$

If this HoSEI; value is less than zero, the lower limit value is cosidered to be zero (0).

(b) YoTAL<b 0 (Temperature will drop below 115° C.):

In case, |A|<3.7 (°C.), the HoSEI value is further compensated by using the following Expression (6):

$$HoSEI_i = HoSEI + 1 \quad (6)$$

In case, |A|≧3.7 (°C.), the HoSEI value is further compensated by using the following Expression (7):

$$HoSEI_i = HoSEI + 2 \quad (7)$$

If this HoSEI; value is greater than two-hunderd and twenty-five (255), thr upper value is considered to be two-hundred and twenty-five (255).

And then, the oNoFD value, calculated by the following expression (8), determines the pulse width in one cycle for the duty control:

$$oNoFD = 30 + ((HoSEI - 128)/4) \quad (8)$$

Namely, the triac 240 is turned on for a period corresponding to the pulse width in the cycle to control the current to be supplied to the heater 60b. Here, the difference, (HoSEI−128), is divided by a quarter (¼) to avoid a sudden surface temperature variation. (See FIG. 16.)

Figure 16:
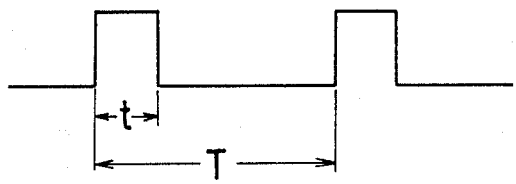
FIG. 16 is a chart for explaining the heat roller surface temperature control by pulse width modulation control in the heat roller surface temperature controller according to the present invention.

In FIG. 16, T and $\tau$ are specified by the following Expressions (9) and (10):

$$T = 1.28 \text{ (sec.)} \quad (9)$$

$$\tau = NoOFD \times 0.01 \text{ (sec.)} \quad (10)$$

Then, the above operations are repeated to adjust the actual surface temperature to the required temperature.

Stepping Motor Driving Current Control Circuit

Figure 3:
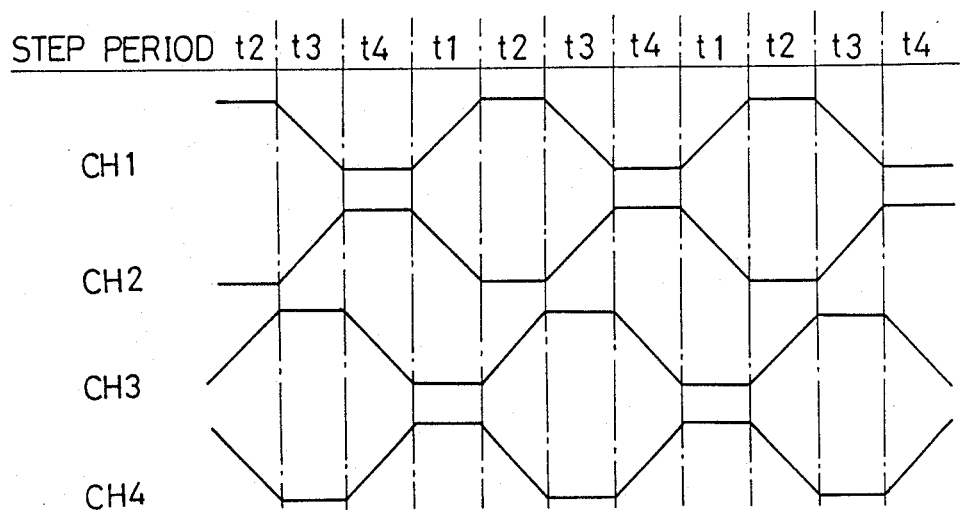
FIG. 3 is a chart showing the driving current waveform of stepping motor, controlled by the driving current control circuit, according to the present invention.
Figure 5:
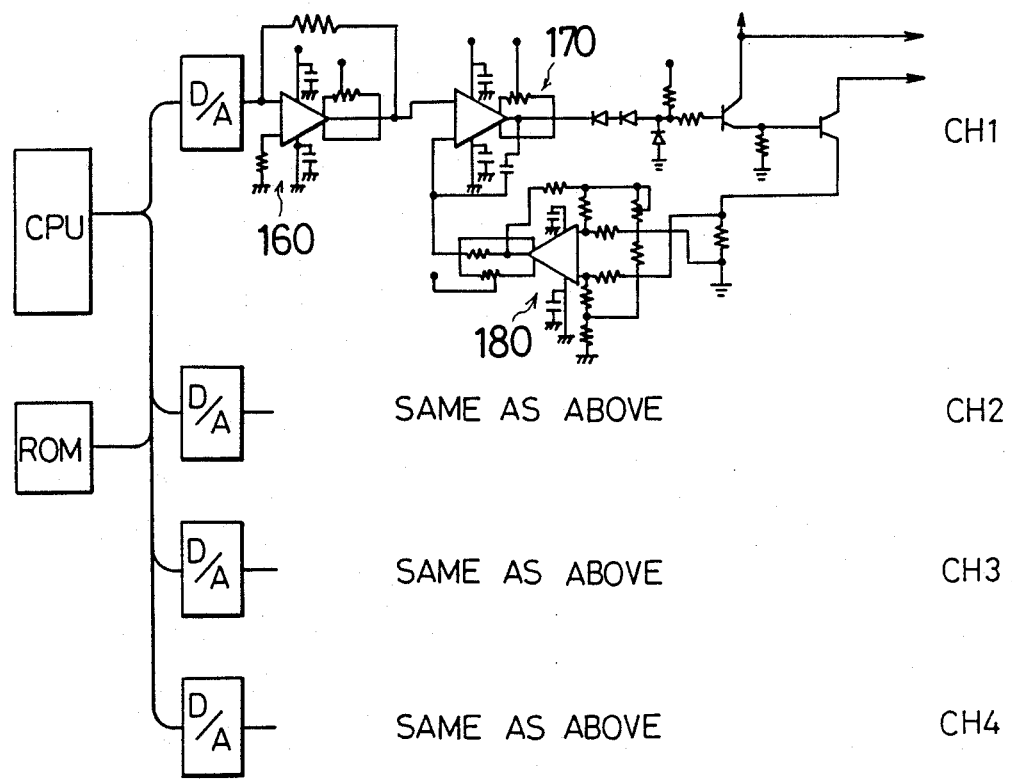
FIG. 5 is a circuit diagram showing the stepping motor driving circuit of the preferred embodiment according to the present invention.

The image information recording unit 5 comprises a laser for recording and a scanning system for scanning the laser beam in the film width direction. One line of image information is recorded in the film width direction by a predetermined cycle. The scanning in the film longitudinal direction is performed by rotating the main driving roller 41 at a low speed. A stepping motor (not shown) for directly driving the main driving roller 41 has an advantage that it can be rotated at a low speed according to input pulses. However, stepping motors have a problem that their angular velocity varies for every one step period, namely, stepping motors have jitter components. Referring to FIGS. 3 and 5, a method to reduce the jitter components and a control circuit for this purpose are explained.

The pulse currents of CH1, CH2, CH3 and CH4 having the saw tooth waveform specified in FIG. 3 are supplied to the the stepping motor for directly driving the main driving roller 41. The CH1 pulse current supplied to the first stator coil terminal gradually increases in the first step period, t1. The maximum value of CH1 is maintained for the entire second period, t2. The CH1 current gradually decreases in the third period. The minimum value of CH1 is maintained in the fourth period. The CH2 pulse current supplied to the second stator coil terminal has a different phase from the CH1 pulse current by 180 deg. The CH3 pulse current supplied to the third stator terminal has a different phase delayed by 90 deg. from the CH1 pulse current The CH4 pulse current supplied to the fourth stator terminal has different phase advanced by 90 deg. from the CH1 pulse current. Accordingly, it can be understood that the driving current for the stepping motor according to the present invention varies smoothly, and that the driving current has jitter components in a smaller degree. In the stepping motor according to the present invention, the pulse current of saw tooth waveform, being different from the conventional rectangular waveform, is applied to the stator terminals to reduce the jitter components.

Figure 4:
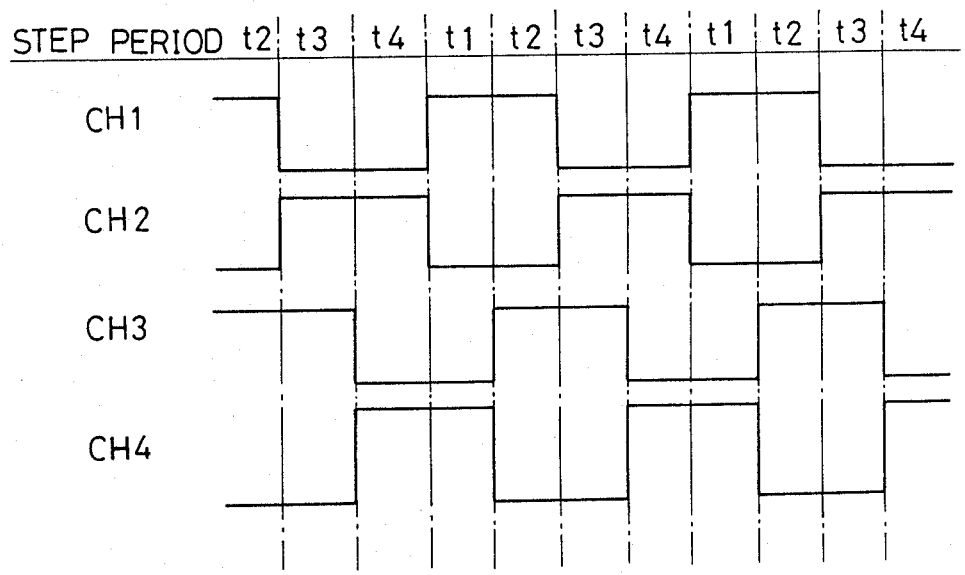
FIG. 4 is a chart showing the driving current waveform of a conventional type stepping motor.

In the laser recorder according to the present invention, one of the features is to rotate the main driving roller 41 smoothly by controlling the control current for the stepping motor directly connected to the main driving roller 41 with a stepping motor driving circuit illustrated in FIG. 5. The driving circuit controls the control current so as to gradually increase or decrease the control current by one micro step resulting from the further division of one step angle. As earlier explained, FIG. 3 illustrates the stepping motor driving current according to the present invention, and FIG. 4 illustrates the conventional stepping motor driving current waveform. The driving circuit illustrated in FIG. 5 has a central processing unit (hereinafter abbreviated to "CPU"), a Read only memory connected to the CPU via a bus line (hereinafter abbreviated to "ROM"), four D/A converters receiving data from the CPU via the bus line, and four power amplifiers for generating pulse currents of CH1, CH2, CH3, and CH4 in accordance with output signals from the D/A converters.

Referring to FIG. 5, the operation of the driving circuit is explained briefly.

First, the CPU periodically accesses the ROM to receive recorded electric current value data, and outputs the electric current data to the D/A's by a predetermined timing.

Second, the D/A's convert the electric current data to analog voltages, and send the analog voltages to the power amplifiers. The power amplifiers supply the output electric currents corresponding to the analog voltages to the stator coil terminals (not shown) of the stepping motor. The power amplifier for channel 1 comprises an amplifier 160, an output current detecting circuit 180, and an output amplifier 170. The channels 1 through 4 to be connected to the stepping motor are connected to the primary amplifier 160 via the D/A converter. The primary amplifier 160 converts the voltage into the currents. The secondary output amplifier 170, connected to the stepping motor, further divides one step angle of the control current by micro steps, and sends the control current by increasing or decreasing micro steps. The output current detecting circuit 180, inversely connected to the secondary output amplifier 170, is a differential amplifier. The output current detecting circuit 180 feeds back phase signals to the secondary amplifier 170, and controls the secondary amplifier 170 so as to generate output currents corresponding to the analog voltage values of the D/A converter. The input data to the D/A converters are sequentially read out of a table in the ROM. The data to be written in the ROM is obtained by measuring jitter components of stepping motors to be used in the laser recorder. Thus, optimum current data for reducing the jitter components are written in the ROM. As for the channels 2 through 4, the same configurations as described above are employed in channels 1 through 4.

The output driving circuit control operation is explained in detail. The step periods, t1, t2, t3, and t4 are each divided into 1024 micro step periods. Because 0.9 deg. of stepping motor rotation angle corresponds to one step period, the stepping motor rotates once when 400 step periods have passed.

When a main driving roller having a 30 mm diameter is used, the one step length, L, is calculated by the following expression:

$$L = 30 \times (0.9/360) = 0.2356 \text{ (mm)}$$

The film advancement speed is 2.5 mm/sec. and the step periods, t1, t2, t3 and t4 are divided into 1024 micro step periods. Therefore the time required for one step, t, and the time required for one micro step, msp, are calculated by using the following expressions respectively:

$t = 0.2536/2.5 = 94.25$ (millisecond/step)

$msp = 94.25/1024 = 92.039$ (microsecond/micro step)

Therefore, the first step period t1 is divided into msp1 through msp1024, and the second step period t2 is divided into msp1025 through msp2048, and the third step period t3 is divided into map2049 through msp3072, and the fourth step period t4 is divided into msp3073 through msp4096.

Accordingly, when output current values for the 4096 micro steps of the first channel current, CH1, are stored in the ROM, it is necessary only to store currents having different phases for the second, third, and fourth channel currents, namely CH2, CH3, and CH4. Specifically speaking, the CPU divides the input clock signals equally on the circumference to generate the micro step pulse signal corresponding to the micro step period.

The CPU has a built-in 12-bit counter (not shown) for counting the micro step pulse signals. The counter outputs 2-bit micro step display information to specify the micro step periods. Because the D/A converters are 12-bit D/A converters, the ROM having 48-Kbit or more memory capacity stores 12-bit current values for every micro step period. And the CPU composes a memory address of the ROM storing the current value for the next "m+1"th micro step period in accordance with micro step display information displaying the "m"th micro step period. Then, the CPU accesses the ROM memory address to receive the channel current, A1, for the "m+1"th micro step period from the ROM and preserves the channel current, A1, for the "m+1"th micro step period. Similarly, the CPU composes a memory address of the ROM storing the current value for "m+1025"th micro step period, and accesses the ROM memory address to receive the channel current, A4, for the "m+1025"th micro step period from the ROM and preserves the channel current, A4, for the "m+1025"th micro step period. In accordance with the same method, the CPU composes memory addresses for the ROM storing the current values for "m+2049"th and "m+3073" micro step periods, and accesses the ROM memory addresses to receive the channel current, A2, for the "m+2049"th micro step period and the channel current A3 for the "m+3073" micro step period from the ROM and preserves the channel current, A4, for the "m+1025"th micro step period. During the "m+1"th micro step period, the CPU continues to output the current values of A1, A2, A3, and A4 to the D/A converters, and then, the CPU reads current values for the "m+2"th, the "m+1026"th, the "m+2050"th, and the "m+3074"th micro step periods out of the ROM. Because the current values A1 and A3, and the current values A2 and A4, are in a complementary relationship, the A2 and A4 current values can be generated by receiving A1 and A3 current values from the ROM and finding their complement values. Because the number of micro step periods are so set that it will be one dot width of the main driving roller 41 or less, the variation of one micro step width is reduced. Thus, favorable quality printing, in which printed dots are distinctly identified by controlling torques, is generated during the micro step periods.

For the stepping motor controller according to the present invention, it is possible to construct the following modified embodiments:

(1) For the stepping motor, various types of motors other than those described above may be employed.

(2) It is possible to reduce the jitter components by controlling pulse voltages to be applied to the stator coil terminals instead of by controlling the currents to be supplied to the stator coil terminals.

(3) The voltage waveforms to be applied to the stator coil terminals or the current waveforms to be supplied to the stator coil terminals are not limited to the saw tooth waveform illustrated in FIG. 3 but they can be determined as desired depending on loads applied to stepping motors and the characteristics of stepping motors.

(4) The waveforms to be applied to the stator coil terminals or the current waveformms to be supplied to the stator coil terminals do not necessarily have similar waveforms for the channels 1 through 4.

Film Storing Mechanism

Figure 17:
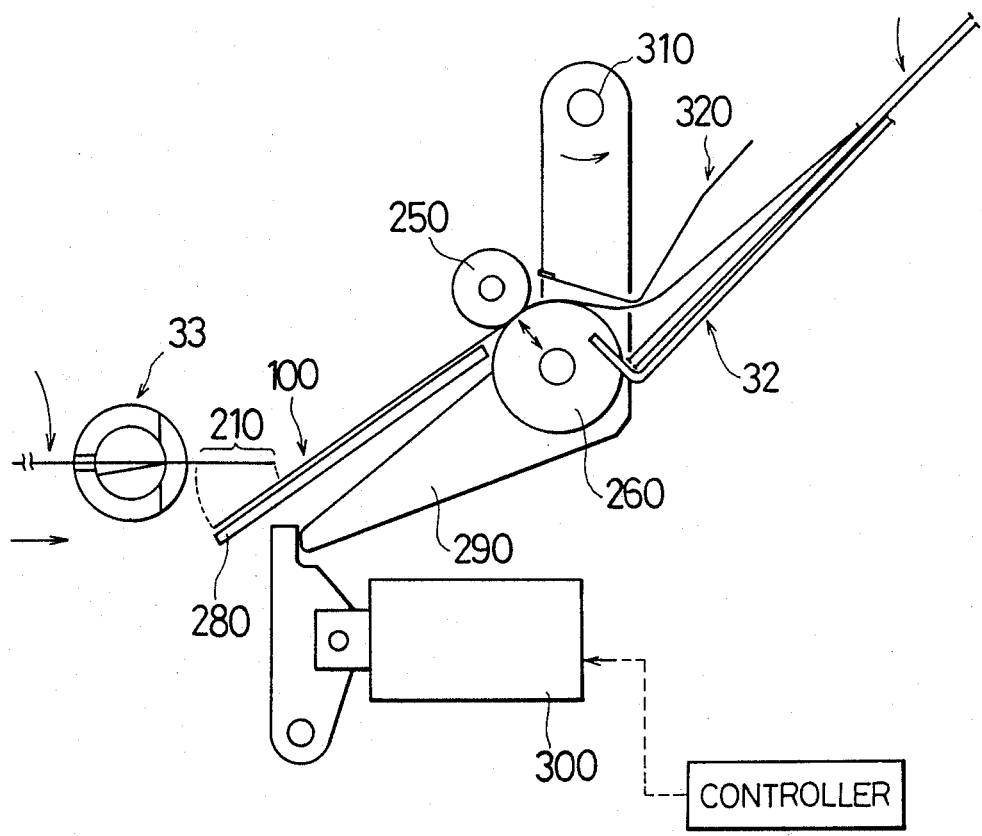
FIG. 17 is a schematic enlarged illustration showing the major sections of film storing mechanism according to the present invention.

A film storing mechanism according to the present invention is illustrated in FIG. 17. The film storing mechanism comprises a cutter 33 for cutting the film 100 to a predetermined length, and a tray 32 for storing the film 100 delivered out of the cutter 33, and a pressure roller 250 and a delivery roller 260 for delivering the film 100 to the tray 32.

In the film storing mechanism, after the film 100 is cut by the cutter 33, the delivery roller 260 is separated from the pressure roller 250 for a predetermined time to stop the film delivery and to overlap the leading edge of the film 100, which is to be cut in the next cutting, on the trailing edge of the film 100, which has been already cut, in a predetermined length.

The film storing mechanism thus constituted operates as follows.

In the cutting operation mode, a cut mark is marked at a predetermined position on the film 100. The cut mark is detected by a sensor (not shown), disposed near the cutter 33. And the sensor provides a signal for stopping the film 100 delivery by separating the delivery roller 260 from the pressure roller 250, and for actuating the cutter 33 after a predetermined time has passed.

Upon the detection of the cut mark on the film delivered out of the heat roller 60, the sensor provides the signal to the cutter 33, and the cutter 33 waits for a predetermined time measured by a timer, and cuts the film 100 at a predetermined position to a predetermined length. The cut film 100 has been advanced along the guide plate 280, and the leading edge of cut film 100 has already been nipped between the delivery roller 260 and the pressure roller 250.

When a lever 290, equipped with the delivery roller 260, is urged by a solenoid 300 to separate the delivery roller 260 from the pressure roller 250, the delivery roller 260 is swung counterclockwise around the shaft 310. As the delivery roller 260 is separated from the pressure roller 250 for a certain period of time, the film 100 delivery is interrupted. On the other hand, the film 100 to be cut in the next cutting is delivered at a fixed speed, and the leading edge of the film 100 to be cut overlaps on the trailing edge of the cut film 100. The overlap is designated by 210 in FIG. 17. The width of overlap 210 depends on the period of time for which the delivery roller 260 is separated from the pressure roller 250. After a predetermined time has passed, the solenoid 300 is de-energized to bring the delivery roller 260 back into contact with the pressure roller 250 to restart the film 100 delivery. Accordingly, the cut film 100 and the film 100 to be cut in the next cutting are delivered to the tray 32 while holding the overlap, the cut films 100 are guided by a retaining spring 320 and stored in the tray 32.

Accordingly, the cut films 100 are delivered out of the delivery roller 260 and the pressure roller 250, and stored in the tray 32 sequentially in the correct order when the film 100 is continuously delivered. In case of a take-up operation mode, the film 100 is not cut by the cutter 33, therefore, it is possible to take-up and store the film 100 continuously in a reel without separating the delivery roller 260 from the pressure roller 250.

What is claimed is:

1. A laser recorder, comprising:
    film feed means for feeding a film in a roll;
    film take-up means for taking up the film;
    driving means for driving the film at a fixed speed, disposed on a film path extending between said film feed means and said film take-up means; and
    image information recording means for radiating a laser beam in a width direction of the film that is driven by said driving means, comprising a laser optical system;
    said driving means comprises:
    a main driving roller which has an outer circumference to be in contact with the film and is driven in a predetermined direction by a stepping motor at the fixed speed;
    a first pressure roller that is pressed against the outer circumference at a first position to nip the film therebetween and is driven by the main driving roller;
    a second pressure roller that is pressed against the outer circumference at a second position and is driven by the main driving roller, said second position being downstream of the first position in the driven direction of said main driving roller, the film being exposed by the laser beam radiated through a position between said first and second pressure rollers;
    a feed driving roller that feeds the film to said main driving roller with forming a loop of the film; and
    a delivery driving roller that delivers the film from said driving roller with forming a loop of the film;
    thereby applying no force of feeding and delivering the film to and from said main driving roller.

2. A laser recorder according to claim 1, wherein film loop detectors are provided between said feed driving roller and said main driving roller, and between said main driving roller and said delivering driving roller, respectively, and
    said feed driving roller and said delivery driving roller are controlled in accordance with signals generated by said film loop detectors.

3. A laser recorder, comprising:
    a film feed unit;

a film take-up unit;

a main driving roller for driving a film drawn out from said film feed unit continuously;

a stepping motor for rotating said main driving roller in a predetermined direction;

a first pressure roller that is pressed against the outer circumference of said main driving roller at a first position to nip the film therebetween and is driven by said main driving roller;

a second pressure roller that is pressed against the outer circumference of said main driving roller at a second position to nip the film therebetween and is driven by said main driving roller, said second position being downstream of said first position in the rotating direction of said main driving roller;

image information recording means for radiating a laser beam in a width direction of the film through a position between said first and second pressure rollers;

film loop forming means each for forming a loop of the film before and after said main driving roller with respect to a direction of film advancement; and control means for controlling an amount of the loop formed by each film loop forming means within a desired amount.

4. A laser recorder according to claim 3, wherein the amount of film loop before said main driving roller with respect to the direction of film advancement is kept within a predetermined range by controlling a film drawn-out amount out of said film feed unit.

5. A laser recorder according to claim 3, wherein a heat-development unit is provided upstream of said film take-up unit with respect to the film advancement direction, and the amount of film loop after said main driving roller with respect to the direction of film advancement is kept within a predetermined range by controlling a film advancement speed toward said heat-development unit.

6. A laser recorder, comprising:

film feed means for feeding a heat development film stored in a role;

a heat developed film take-up unit;

main driving means for driving the film at a fixed speed, disposed on a film path extending between said film feed means and said film take-up unit;

image information recording means for radiating a laser beam in a width direction of the film which is driven by said main driving means, comprising a laser optical system;

heat development means for heat-developing an image information recorded on the film by said image information recording means, disposed between said main driving means and said heat-developed film take-up unit on the film path;

wherein said heat development means comprises:

a heat roller having an outer circumference with which the film is brought into contact and by which the film is heated; and a swing roller for selectively urging one side of the film from a first position wherein the film is separated from said heat roller to a second position wherein the film is in contact with said heat roller.

7. A laser recorder according to claim 6, wherein said swing roller is disposed at the same side of said heat roller and swings to urge the film to the other side to separate the film from said heat roller.

8. A laser recorder according to claim 6, wherein said swing roller is disposed at an opposite side to the side of the heat roller against the film, and swings to urge the film to be brought into contact with said heat roller.

9. A laesr recorder, comprising:

a film feed unit;

a film take-up unit;

main driving means for driving a film drawn out of said film feed unit;

image information recording means for radiating a laser beam in a width direction of the film which is driven by said main driving means;

heat development means for heat-developing an image information recorded on the film;

means for detecting a surface temperature of said heat development means;

means for storing temperature data given from said surface temperature detector; and means for controlling a current to be supplied to said heat development means on a basis of the stored temperature data and the present temperature data.

10. The laser recorder according to claim 9, wherein said heat development means comprises a heat roller having a built-in heater and said detecting means includes a thermoresistor.

11. A laser recorder, comprising:

a film feed unit;

driving means for driving a film drawn out of said film feed unit;

an image information recording means for radiating a laser beam in a width direction of the film that is driven by said main driving means;

a cutter for cutting an image information recorded film to a desired length;

a tray for storing the film delivered out of said cutter;

delivery means for delivering the cut film to said tray; and means for releasing the operation of said delivery means for a predetermined time to stop a film delivery after cutting by said cutter, wherein a leading edge of a film to be cut in a next cutting is overlapped in a predetermined length on a trailing edge of the film that has been cut

* * * * *